United States Patent
Jiang

(10) Patent No.: US 11,044,659 B2
(45) Date of Patent: Jun. 22, 2021

(54) NETWORK SLICING ACCESS METHOD AND APPARATUS

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 43 days.

(21) Appl. No.: 16/608,811

(22) PCT Filed: Apr. 26, 2017

(86) PCT No.: PCT/CN2017/081973
§ 371 (c)(1),
(2) Date: Oct. 25, 2019

(87) PCT Pub. No.: WO2018/141134
PCT Pub. Date: Aug. 9, 2018

(65) Prior Publication Data
US 2021/0105702 A1 Apr. 8, 2021

(51) Int. Cl.
*H04W 48/08* (2009.01)
*H04W 74/08* (2009.01)
*H04W 74/00* (2009.01)

(52) U.S. Cl.
CPC ......... *H04W 48/08* (2013.01); *H04W 74/006* (2013.01); *H04W 74/0866* (2013.01)

(58) Field of Classification Search
None
See application file for complete search history.

(56) References Cited

U.S. PATENT DOCUMENTS

| 9,775,045 | B2 | 9/2017 | Li et al. |
| 10,911,943 | B2* | 2/2021 | Chou ............... H04W 48/12 |
| 2017/0079059 | A1 | 3/2017 | Li et al. |

FOREIGN PATENT DOCUMENTS

| CN | 10127706 A | 7/2008 |
| CN | 106550396 A | 3/2017 |
| WO | 2017044151 A1 | 3/2017 |

OTHER PUBLICATIONS

The Extended European Search Report issued to EP Application No. 17895480.6 dated Mar. 11, 2020, (11p).
InterDigital Communications, "PRACH Resources for NR", R2-1702870, 3GPP TSG-RAN WG2 Meeting #97bis, Spokane, WA, Apr. 3-7, 2017, (2p).
Xiaomi, "Visibility of Slicing to UE", R2-1702529, 3GPP TSG-RAN WG2 #97bis, Spokane, WA, Apr. 3-7, 2017 (6p).

(Continued)

*Primary Examiner* — Hong S Cho
(74) *Attorney, Agent, or Firm* — Arch & Lake LLP

(57) ABSTRACT

An accessing method related to network slicing, being applied to a base station, includes: generating minimum system information, the minimum system information including two items: i) indication information indicating presence of physical random access channel (PRACH) configuration information, corresponding to one or more network slices, in other system information, ii) common random access channel configuration information; and sending the minimum system information to a user equipment.

18 Claims, 12 Drawing Sheets

---

101

Generate minimum system information, the minimum system information including: indication information indicating presence of PRACH configuration information corresponding to one or more network slices, in other system information, and common random access channel configuration information

102

Send the minimum system information to UE

(56) References Cited

OTHER PUBLICATIONS

Impact of Slicing on System Information, Nokia, Alcatel-Lucent Shanghai Bell, 3GPP TSG-RAN WG2 NR Adhoc, Spokane, USA, Jan. 17-19, 2017 (3p).
Indications of On-Demand System Information, Huawei, HiSilicon, 3GPP TSG-RAN WG2 #97bis, Spokane, USA, Apr. 3-7, 2017 (4p).
PRACH Partitioning, Access and Congestion Control Consideration for Network Slicing, Xiaomi, 3GPP TSG-RAN WG2 #97, Athens, Greece, Feb. 13-17, 2017 (3p).
International Search Report to PCT Application No. PCT/CN2017/081973 dated Feb. 2, 2018 and English translation (6p).
First Office Action issued to Indian Application No. 201927047914 dated Mar. 18, 2021, (6p).

* cited by examiner

NETWORK SLICING ACCESS METHOD AND APPARATUS

CROSS REFERENCE TO RELATED APPLICATIONS

This application is a national phase application under 35 U.S.C. § 371 of International Patent Application No. PCT/CN2017/081973, filed on Apr. 26, 2017, the entire contents of which are incorporated herein by reference for all purposes.

TECHNICAL FIELD

The present disclosure relates to the field of communications technologies, and in particular, to an accessing method and an accessing apparatus related to network slicing.

BACKGROUND

In the related art, a user equipment (UE) needs to acquire configuration information of a channel before acquiring resources through the channel. The network side may send configuration information of the channel to the UE through a system information. There are many kinds of system information. How to notify about the configuration information more conveniently through the system information is an urgent problem to be solved.

SUMMARY

Embodiments of the present disclosure provide an accessing method and an accessing apparatus related to network slicing. The technical solution is as follows.

According to a first aspect of the embodiments of the present disclosure, there is provided an accessing method related to network slicing, being applied to a base station and including:

generating minimum system information, the minimum system information including two items:
  i) indication information indicating presence of physical random access channel (PRACH) configuration information, corresponding to one or more network slices, in other system information,
  ii) common random access channel configuration information; and sending the minimum system information to a user equipment.

The technical solution provided by the embodiment of the present disclosure may include the following beneficial effects. According to the embodiment, the minimum system information is used for carrying the indication information about the network slice, facilitating the user equipment to acknowledge whether the corresponding PRACH configuration information of one or more network slices is present in other system information. The user equipment may be able to determine the corresponding PRACH configuration information through the other system information, thereby reducing possibility of acquiring redundant information by the user equipment improving and the efficiency of acquiring corresponding PRACH configuration information of the network slice.

In an embodiment, the indication information indicating presence of PRACH configuration information, corresponding to one or more network slices, in other system information includes:

respective network slice identification information of the one or more network slices corresponding to which the PRACH configuration information is present in the other system information.

The technical solution provided by the embodiment of the present disclosure may include the following beneficial effects. According to the embodiment, the indication information indicating presence of PRACH configuration information, corresponding to one or more network slices, in other system information includes: respective network slice identification information of the one or more network slices corresponding to which the PRACH configuration information is present in the other system information. A structure of the minimum system information is thus provided. The user equipment may acknowledge whether the corresponding PRACH configuration information of one or more network slices is present in the other system information, thereby facilitating the user equipment to acquire corresponding PRACH configuration information of the network slice through the other system information.

In an embodiment, the indication information indicating presence of PRACH configuration information, corresponding to one or more network slices, in other system information further includes:

a serial number of the other system information in which the PRACH configuration information corresponding to at least one network slice is present.

The technical solution provided by the embodiment of the present disclosure may include the following beneficial effects. According to the embodiment, the indication information indicating presence of PRACH configuration information, corresponding to one or more network slices, in other system information further includes: a serial number of the other system information in which the PRACH configuration information corresponding to at least one network slice is present. A structure of the minimum system information is thus provided, thereby facilitating the user equipment acknowledge in which other system information corresponding PRACH configuration information of the network slice is present and, further, to acquire the corresponding PRACH configuration information of the network slice through the other system information.

According to a second aspect of the embodiments of the present disclosure, there is provided an accessing method related to network slicing, being applied to a user equipment and including:

receiving minimum system information sent by a base station, the minimum system information including two items:
  i) indication information indicating presence of physical random access channel (PRACH) configuration information, corresponding to one or more network slices, in other system information,
  ii) common random access channel configuration information;

determining whether PRACH configuration information corresponding to at least one network slice of the user equipment is present in other system information according to the indication information indicating presence of PRACH configuration information, corresponding to one or more network slices, in other system information and the at least one network slice corresponding to the user equipment;

acquiring, if PRACH configuration information corresponding to any network slice of the user equipment is present in other system information, the PRACH configuration information corresponding to the network slice included in the other system information, and accessing the network slice according to the PRACH configuration information corresponding to the network slice included in the other system information; and acquiring, if PRACH configuration information corresponding to any network slice of the user equipment is not present in other system information, the common random access channel configuration information, and accessing the network slice according to the common random access channel configuration information.

The technical solution provided by the embodiment of the present disclosure may include the following beneficial effects. According to the embodiment, the user equipment may be able to acquire, through the minimum system information, the indication information indicating presence of PRACH configuration information, corresponding to one or more network slices, in other system information. Through the indication information, it may be acknowledged whether the PRACH configuration information corresponding to at least one network slice of the user equipment is present in other system information. If the corresponding PRACH configuration information of any network slice corresponding to the user equipment is present in other system information, the corresponding PRACH configuration information of the network slice included in the other system information may be acquired, and the network slice may be accessed according to the corresponding PRACH configuration information of the network slice included in the other system information. An implementation example is thus provided by the embodiment for the user equipment to acknowledge corresponding PRACH configuration information of the network slice.

In an embodiment, the indication information indicating presence of PRACH configuration information, corresponding to one or more network slices, in other system information includes:

respective network slice identification information of the one or more network slices corresponding to which the PRACH configuration information is present in the other system information.

The technical solution provided by the embodiment of the present disclosure may include the following beneficial effects. According to the embodiment, the user equipment may be able to promptly acknowledge, through respective network slice identification information of the one or more network slices, whether corresponding PRACH configuration information of at least one network slice corresponding to the user equipment is present in other system information.

In an embodiment, the indication information indicating presence of PRACH configuration information, corresponding to one or more network slices, in other system information further includes:

a serial number of the other system information in which the PRACH configuration information corresponding to any network slices is present;

the acquiring the PRACH configuration information corresponding to the network slice included in the other system information includes:

acquiring the PRACH configuration information corresponding to the network slice included in the other system information according to the serial number of the other system information in which the PRACH configuration information corresponding to any network slices is present.

The technical solution provided by the embodiment of the present disclosure may include the following beneficial effects. According to the embodiment, the user equipment may be able to acknowledge in which other system information corresponding PRACH configuration information of which network slice is present and, further, to acquire the corresponding PRACH configuration information of the network slice through the corresponding system information. An implementation example is thus provided by the embodiment for the user equipment to acquire corresponding PRACH configuration information of the network slice.

According to a third aspect of the embodiments of the present disclosure, there is provided an accessing apparatus related to network slicing, being applied to a base station and including:

a generating module, configured to generate minimum system information, the minimum system information including two items:
  i) indication information indicating presence of physical random access channel (PRACH) configuration information, corresponding to one or more network slices, in other system information,
  ii) common random access channel configuration information; and
a sending module, configured to send the minimum system information to a user equipment.

In an embodiment, the indication information indicating presence of PRACH configuration information, corresponding to one or more network slices, in other system information includes:

respective network slice identification information of the one or more network slices corresponding to which the PRACH configuration information is present in the other system information.

In an embodiment, the indication information indicating presence of PRACH configuration information, corresponding to one or more network slices, in other system information further includes:

a serial number of the other system information in which the PRACH configuration information corresponding to at least one network slice is present.

According to a fourth aspect of the embodiments of the present disclosure, there is provided an accessing apparatus related to network slicing, being applied to a user equipment and including:

a receiving module, configured to receive minimum system information sent by a base station, the minimum system information including two items:
  i) indication information indicating presence of physical random access channel (PRACH) configuration information, corresponding to one or more network slices, in other system information,
  ii) common random access channel configuration information;
a determining module, configured to determine whether PRACH configuration information corresponding to at least one network slice of the user equipment is present in other system information according to the indication information indicating presence of PRACH configuration information, corresponding to one or more network slices, in other system information and the at least one network slice corresponding to the user equipment;
a first acquiring module, configured to acquire, if PRACH configuration information corresponding to any network slice of the user equipment is present in other system information, the PRACH configuration information corresponding to the network slice included in the other system information, and access the network slice according to the PRACH configuration information corresponding to the network slice included in the other system information; and
a second acquiring module, configured to acquire, if PRACH configuration information corresponding to any network slice of the user equipment is not present in other system information, the common random access channel configuration information, and accessing the network slice according to the common random access channel configuration information.

In an embodiment, the indication information indicating presence of PRACH configuration information, corresponding to one or more network slices, in other system information includes:

respective network slice identification information of the one or more network slices corresponding to which the PRACH configuration information is present in the other system information.

In an embodiment, the indication information indicating presence of PRACH configuration information, corresponding to one or more network slices, in other system information further includes:

a serial number of the other system information in which the PRACH configuration information corresponding to any network slices is present;

the first acquiring module includes:

a first acquiring submodule configured to acquire the PRACH configuration information corresponding to the network slice included in the other system information according to the serial number of the other system information in which the PRACH configuration information corresponding to any network slices is present.

According to a fifth aspect of the embodiments of the present disclosure, there is provided an accessing device related to network slicing, being applied to a base station and including:

a processor, and a memory configured to store instructions executable by the processor;

wherein the processor is configured to:

generate minimum system information, the minimum system information including two items:
 i) indication information indicating presence of physical random access channel (PRACH) configuration information, corresponding to one or more network slices, in other system information,
 ii) common random access channel configuration information; and
send the minimum system information to a user equipment.

According to a sixth aspect of the embodiments of the present disclosure, there is provided an accessing device related to network slicing, being applied to a user equipment and including:

a processor, and a memory configured to store instructions executable by the processor;

wherein the processor is configured to:

receive minimum system information sent by a base station, the minimum system information including two items:
 i) indication information indicating presence of physical random access channel (PRACH) configuration information, corresponding to one or more network slices, in other system information,
 ii) common random access channel configuration information;
determine whether PRACH configuration information corresponding to at least one network slice of the user equipment is present in other system information according to the indication information indicating presence of PRACH configuration information, corresponding to one or more network slices, in other system information and the at least one network slice corresponding to the user equipment;

acquire, if PRACH configuration information corresponding to any network slice of the user equipment is present in other system information, the PRACH configuration information corresponding to the network slice included in the other system information, and access the network slice according to the PRACH configuration information corresponding to the network slice included in the other system information; and acquire, if PRACH configuration information corresponding to any network slice of the user equipment is not present in other system information, the common random access channel configuration information, and access the network slice according to the common random access channel configuration information.

According to a seventh aspect of the embodiments of the present disclosure, there is provided a non-transitory computer-readable storage medium, configured to store a computer instruction, the instruction, when executed by a processor, being used for performing the above-described method applied to the base station.

According to a fourth aspect of the embodiments of the present disclosure, there is provided a non-transitory computer-readable storage medium, configured to store a computer instruction, the instruction, when executed by a processor, being used for performing the above-described method applied to the user equipment.

It is to be noted that the above general description and the following detailed description are merely illustrative and illustrative and are not restrictive.

BRIEF DESCRIPTION OF THE DRAWINGS

The accompanying drawings herein are incorporated in and constitute a part of this specification, illustrate embodiments conforming to the present disclosure and, together with the specification, serve to explain the principles of the present disclosure.

DETAILED DESCRIPTION OF THE EMBODIMENTS

Reference will now be made in detail to exemplary embodiments, examples of which are illustrated in the accompanying drawings. When accompanying figures are mentioned in the following descriptions, the same numbers in different drawings represent the same or similar elements, unless otherwise represented. The implementations set forth in the following description of exemplary embodiments do not represent all implementations consistent with the present disclosure. Instead, they are merely examples of apparatuses and methods consistent with some aspects related to the present disclosure as recited in the appended claims.

In the related art, a new method for network resource division, namely network slicing, is provided where each network slice carries a certain type of business or service. Cell accessing is implemented through PRACH (Physical Random Access Channel) over the network slice. However, it has not been clearly defined which system information is used for carrying PRACH configuration information of the network slice.

New types of system information are also provided in the related art, including minimum system information (minimum SI, minimum system information) and other system information (other SI, other system information). However, it has not been clearly defined how to use the minimum system information and other system information for carrying the PRACH configuration information of the network slice.

The minimum system information may carry the PRACH configuration information of all network slices. However, the minimum system information has a small length and, thus, may not be able to carry the PRACH configuration information of all network slices.

In order to solve the above problem, indication information of the network slice, that is, the indication information indicating presence of corresponding PRACH configuration information of one or more network slices in other system information, is carried by the minimum system information according to the embodiments. Thus, the PRACH configuration information of network slices may be carried by the other system information. User equipment (UE) may learn whether the PRACH configuration information of any network slice is present in other system information through the minimum system information and may acquire, if it is present in other system information, the other system information to obtain the PRACH configuration information of the network slice, so as to complete cell accessing.

Figure 1:
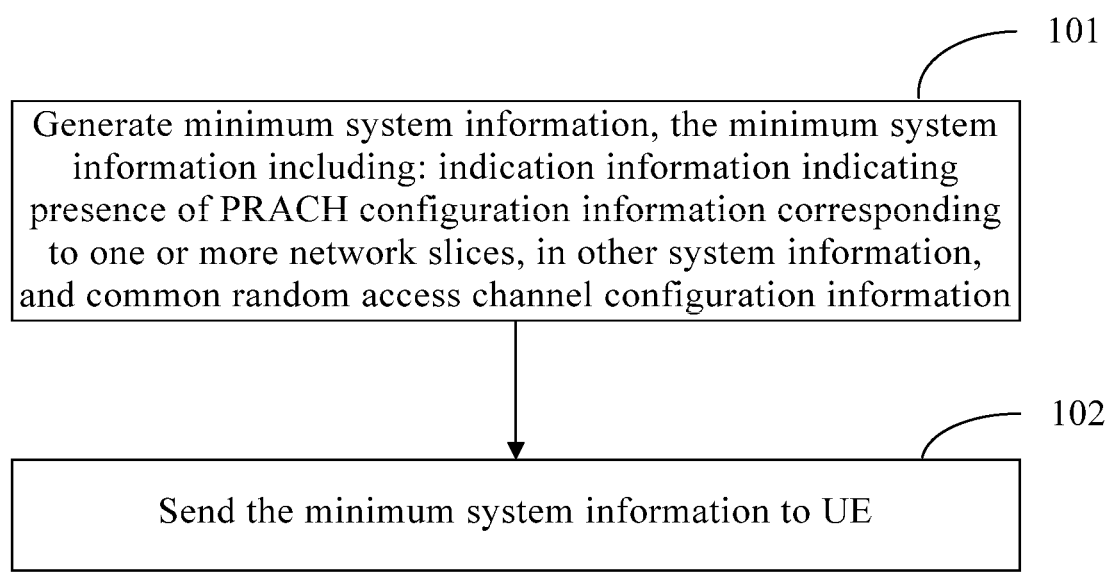
FIG. 1 is a flowchart illustrating an accessing method related to network slicing according to an exemplary embodiment.

FIG. 1 is a flowchart illustrating an accessing method related to network slicing according to an exemplary embodiment. The accessing method related to network slicing may be applied to a network side which may include an access network equipment such as a base station. As shown in FIG. 1, the method includes following steps 101-102.

In step 101, minimum system information is generated. The minimum system information may include following two items:
 i) indication information indicating presence of PRACH configuration information, corresponding to one or more network slices, in other system information, and
 ii) common random access channel configuration information.

In step 102, the minimum system information is sent to a UE.

The minimum system information in the embodiment may also include related information of cell selection and accessing as well as scheduling information of other system information.

According to the embodiment, the minimum system information may include indication information related to network slicing, which is used for indicating whether PRACH configuration information corresponding to network slicing is carried in other system information. Based on the indication information, UE may determine whether the PRACH configuration information of any network slice, corresponding to a local service, is present in other system information, acquire, if it is present in other system information, the other system information to obtain the PRACH configuration information of the network slice corresponding to the local service, and acquire, if it is not present in other system information, the common random access channel configuration information in the minimum system information, so as to complete cell accessing through common random access channel.

In an embodiment, the indication information indicating presence of PRACH configuration information, corresponding to one or more network slices, in other system information includes:
 respective network slice identification information of the one or more network slices corresponding to which the PRACH configuration information is present in the other system information.

Figure 2:
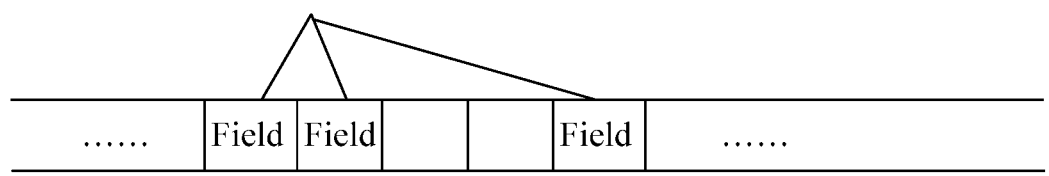
FIG. 2 is a schematic diagram illustrating a structure of minimum system information according to an exemplary embodiment.

As shown in FIG. 2, it illustrates a message structure of minimum system information including information of network slice identifiers. Each network slice identifier may occupy a field. There may be one or more network slice identifier. Multiple implementation modes may be adopted. In mode 1, the minimum system information may carry a network slice identifier of a network slice for which the corresponding PRACH configuration information is configured in other system information. As to those network slices for which the corresponding PRACH configuration information is not configured in other system information, the network slice identifier may be defaulted and does not occupy the field. In mode 2, the minimum system information may carry network slice identifier of all network slices. As to those network slices for which the corresponding PRACH configuration information is configured in other system information, a filed at which the corresponding network slice identifier is located may has a value indicating that the corresponding PRACH configuration information has been configured. As to those network slices for which the corresponding PRACH configuration information is not configured in other system information, the corresponding network slice identifier field has a value indicating that the corresponding PRACH configuration information is not configured, or the field may be empty.

The communication system may be pre-configured with a correspondence between network slice identification information and serial numbers of other system information. The correspondence may be stored at the network side and UE. The minimum system information may not include serial numbers of other system information. When the network slice identifier included in the minimum system information corresponds to PRACH configuration information present in other system information, UE may determine a serial number of other system information corresponding to the network slice identifier based on the stored correspondence, then acquire corresponding other system information based on the serial number of the other system information to obtain corresponding PRACH configuration information of the network slice, and complete cell accessing.

Optionally, the communication system may be pre-configured with an order of serial numbers for other system information, such as an order including other system information serial number 3, other system information serial number 1, and other system information serial number 2. UE may determine, through network slice identifier information carried in the minimum system information, that the network side may carry corresponding PRACH configuration information of the required network slice in other system information. UE may first acquire other system information with the serial number 3 to check whether there is corresponding PRACH configuration information of the required network slice and obtain, if yes, the corresponding PRACH configuration information of the required network slice is obtained. If not, UE acquires other system information with the serial number 1, and so on.

In an embodiment, the network slice identifier includes network slice flag bit information or network slice serial number information.

Figure 3:
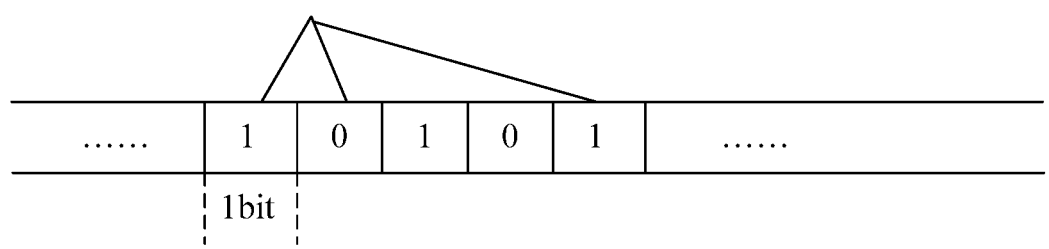
FIG. 3 is a schematic diagram illustrating a structure of minimum system information according to an exemplary embodiment.

As shown in FIG. 3, it illustrates a message structure of minimum system information including network slice flag bit information. Each network slice flag bit information occupies 1 bit. In other words, a field length corresponding to the network slice identifier is 1 bit. The order of respective network slice flag bit information in the minimum system information corresponds to a preset order of network slices. For example, the first network slice flag bit information in the minimum system information corresponds to the network slice 1, and so on. According to the sequence, UE may learn the network slice corresponding to the network slice flag bit information. For example, when a value of the network slice flag information is 1, it indicates that corresponding PRACH configuration information of the corresponding network slice is present in other system information; when a value of the network slice flag information is 0, it indicates that corresponding PRACH configuration information of the corresponding network slice is not present in other system information.

Figure 4:
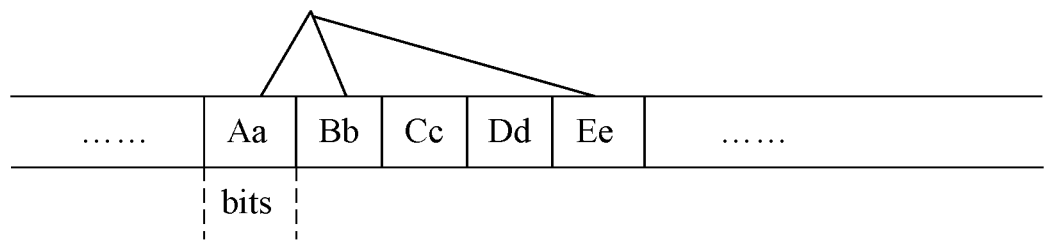
FIG. 4 is a schematic diagram illustrating a structure of minimum system information according to an exemplary embodiment.

As shown in FIG. 4, it illustrates a message structure of minimum system information including network slice serial number information. Serial number information of each network slice may occupy multiple bits, depending on a length of the network slice serial number information. In other words, a field length corresponding to the network slice identifier has multiple bits. Serial number information of respective network slice in the minimum system information may be in a preset order or may not have a preset order. As UE may acknowledge corresponding network slice based on the serial number information thereof, in order to save the length of information, the serial number information of the network slice carried by the minimum system information may be that of those network slices corresponding to which PRACH configuration information is present in other system information. The serial number information of those network slices corresponding to which PRACH configuration information is not present in other system information may be not carried in the minimum system information. Optionally, the minimum system information may carry serial number information of all network slices, and in combination with the example shown in FIG. 3, the minimum system information may also include network slice flag bit information.

In an embodiment, the network slice identifier information includes a single network slice identifier information or a group network slice identifier information of the network slice.

The single network slice identifier information refers to each network slice identified by a piece of network slice identifier information, while the group network slice identifier information refers to a set network slices, corresponding to one or more network slices, identified by a piece of network slice identifier information. The network slices may be grouped in advance, and the grouped information may be stored at both the network side and UE. The use of group network slice identifier information can save a length of the minimum system information.

In an embodiment, the indication information indicating presence of PRACH configuration information, corresponding to one or more network slices, in other system information further includes:

a serial number of the other system information in which the PRACH configuration information corresponding to at least one network slice is present.

Figure 5:
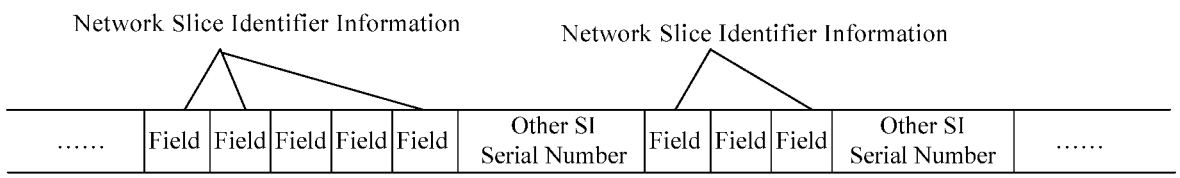
FIG. 5 is a schematic diagram illustrating a structure of minimum system information according to an exemplary embodiment.

As shown in FIG. 5, the minimum system information includes both network slice identifier information and serial numbers of corresponding other system information. Through a structure of the minimum system information, the correspondence between the network slice identifier information and serial numbers of other system information is indicated. FIG. 5 illustrates an implementation, but other implementations may be also applicable to this embodiment. Taking FIG. 5 as an example, one or more network slice identifiers are followed by an other system information serial number, indicating that the continuous network slice identifiers, preceding to the other system information serial number, correspond to the other system information serial number. If the minimum system information carries only one other system information serial number, it indicates that the network slice identifier information carried by the minimum system information corresponds to the one other system information serial number. If the minimum system information carries multiple other system information serial numbers, the successive network slice identifiers, preceding to each other system information serial number, correspond to such other system information serial number.

If the network slice identifier information is a single network slice identifier information, there is a correspondence between other system information serial numbers and network slices. If the network slice identifier information is group network slice identifier information, there is a correspondence between other system information serial numbers and groups of the network slice.

Figure 6:
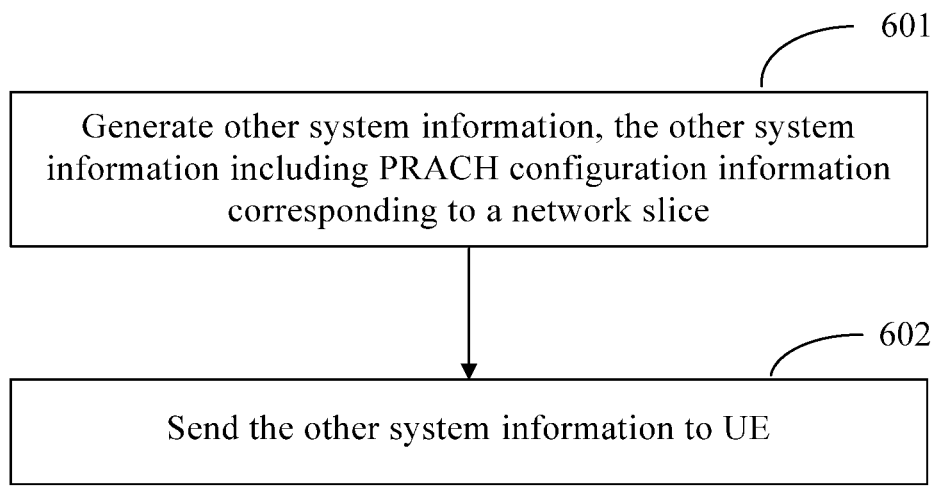
FIG. 6 is a flowchart illustrating an accessing method related to network slicing according to an exemplary embodiment.

FIG. 6 is a flowchart illustrating an accessing method related to network slicing according to an exemplary embodiment. The accessing method related to network slicing may be applied to a network side which may include an access network equipment such as a base station. As shown in FIG. 6, the method includes following steps 601-602.

In step 601, other system information is generated. The other system information may include PRACH configuration information corresponding to a network slice. The network slice is indicated by indication information in minimum system information.

In step 602, the other system information is sent to a UE.

The network side may send, upon receiving a request from UE, other system information to UE that sends the request. Optionally, the network side may broadcast the other system information, that is, send the other system information to multiple UEs.

In an embodiment, the other system information may further include a serial number of next other system information or a presence flag of the next other system information.

The minimum system information may carry other system information serial numbers or may not carry other system information serial numbers. In either case, one piece of other system information may be not able to carry corresponding PRACH configuration information for all network slices indicated by the minimum system information. Therefore, other system information may also include a serial number of next other system information or a presence flag of the next other system information. If UE does not obtain corresponding PRACH configuration information of network slice as locally required in current other system information, UE may acquire the corresponding other system information according to the serial number of next other system information number, so as to obtain the corresponding PRACH configuration information of network slice as locally required. If the other system information carries the presence flag of next other system information, a value (e.g., the value is 1) of the presence flag indicating that the next other system information carries the corresponding PRACH configuration information of network slice, UE may acquire the next other system information based on a pre-configured sequence of serial numbers of other system information, so as to obtain the corresponding PRACH configuration information of the network slice as locally required. If the other system information does not carry any serial number of next other system information, or a value of the presence flag (e.g., the value is 0) indicates that the next other system information does not carry the corresponding PRACH configuration information of network slice, UE may obtain he common random access channel configuration information in the minimum system information and access the network slice according to the common random access channel configuration information, that is, complete cell accessing.

The implementation process at the network side in the process of accessing the network slice is described above. The implementation process at UE is described below.

Figure 7:
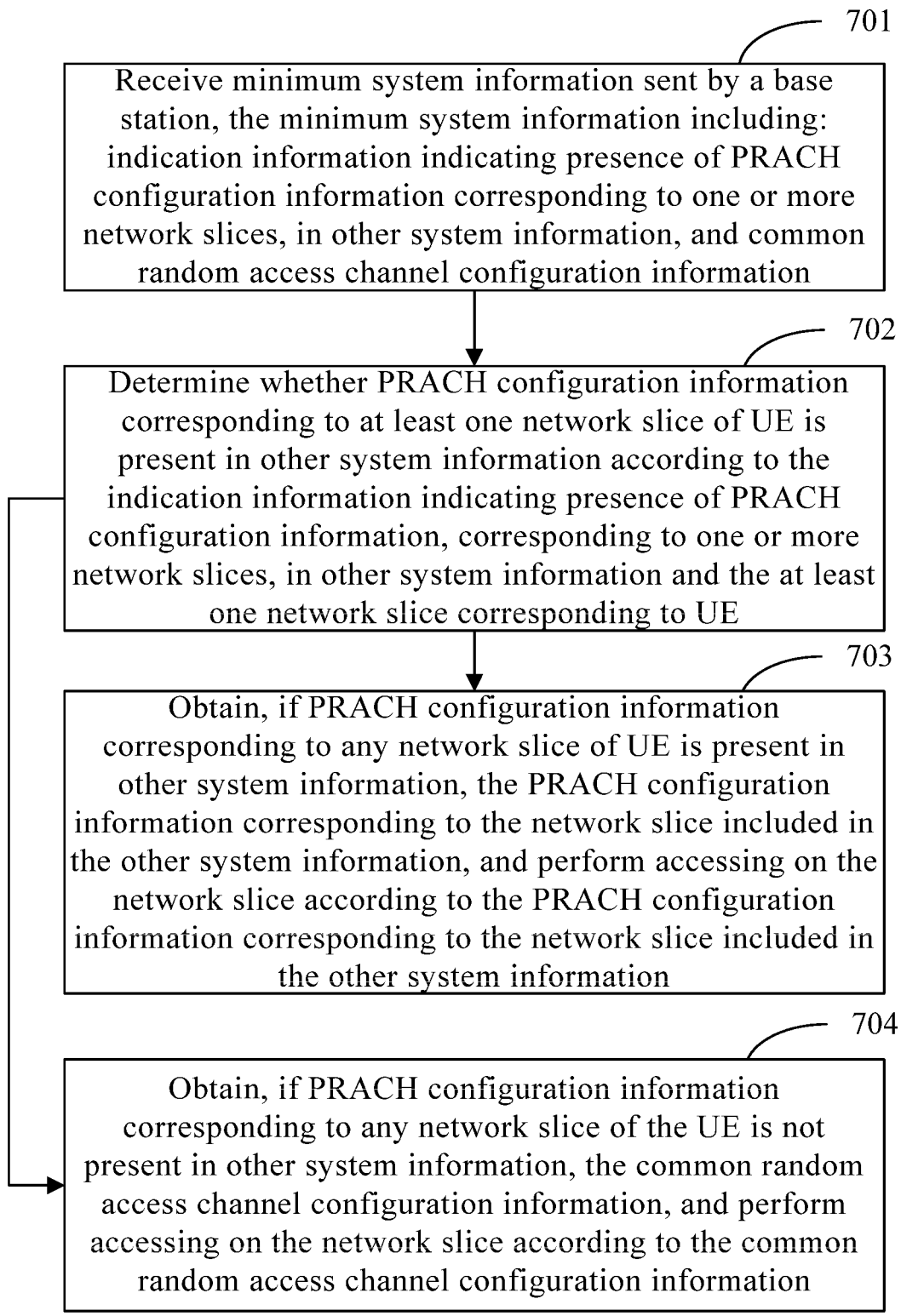
FIG. 7 is a flowchart illustrating an accessing method related to network slicing according to an exemplary embodiment.

FIG. 7 is a flowchart illustrating an accessing method related to network slicing according to an exemplary embodiment. The accessing method related to network slicing may be applied to a terminal which may include an equipment with mobile communication function, such as a mobile phone. As shown in FIG. 7, the method includes following steps 701-704.

In step 701, minimum system information sent by a base station is received. The minimum system information may include following two items:
i) indication information indicating presence of PRACH configuration information, corresponding to one or more network slices, in other system information, and
ii) common random access channel configuration information.

In step 702, it is determined whether PRACH configuration information corresponding to at least one network slice of UE is present in other system information according to the indication information indicating presence of PRACH configuration information, corresponding to one or more network slices, in other system information and the at least one network slice corresponding to UE.

In step 703, if PRACH configuration information corresponding to any network slice of UE is present in other system information, the PRACH configuration information corresponding to the network slice included in the other system information is obtained, and accessing is performed on the network slice according to the PRACH configuration information corresponding to the network slice included in the other system information.

In step 704, if PRACH configuration information corresponding to any network slice of the UE is not present in other system information, the common random access channel configuration information is obtained, and accessing is performed on the network slice according to the common random access channel configuration information.

The network side may periodically broadcast the minimum system information. UE may receive the minimum system information and parse out indication information indicating presence of PRACH configuration information, corresponding to one or more network slices, in other system information, that is, the indication information of the network slice. UE may determine the network slice to be accessed according to the local service or business, and determine the corresponding network slice serial number. According to the indication information of network slice in the minimum system information, it is determined whether network slices indicated by the indication information includes the network slice as locally required. If the network slice required locally is included, UE may acquire the corresponding other system information, obtain corresponding PRACH configuration information of the network slice required locally from the other system information, then determine PRACH to the PRACH configuration information, and complete cell accessing through the PRACH. If the network slice required locally is not included, UE may obtain the common random access channel configuration information from the minimum system information, determine common random access channel according to the common random access channel configuration information, and then complete cell accessing through the common random access channel.

The network side may also broadcast other system information. For example, the network side determines that multiple UEs in the cell need to receive other system information, and then adopts the broadcast mode. UEs may acquire the other system information broadcasted according to scheduling information of other system information in the minimum system information.

Optionally, UE may send a request for acquiring other system information to the network side, the request including a serial number of other system information. The network side may feed corresponding other system information back to UE according to the request of UE.

In an embodiment, the indication information indicating presence of PRACH configuration information, corresponding to one or more network slices, in other system information includes:

respective network slice identification information of the one or more network slices corresponding to which the PRACH configuration information is present in the other system information.

In an embodiment, the network slice identifier includes network slice flag bit information or network slice serial number information.

As shown in FIG. 3, the network slice identifier includes network slice flag bit information. Based on a known sequence of network slice flag bit information, UE may determine network slice flag bit information corresponding the network slice locally required. When a value of the network slice flag bit information indicates that corresponding PARCH configuration information of the network slice locally required is present in other system information, UE may determine, according to a preset correspondence between network slice serial number information and other system information serial numbers, a serial number of other system information corresponding to the network slice locally required, acquire scheduling information of the other system information corresponding to the serial number of other system information from the minimum system information, and obtain the other system information according to the scheduling information.

As shown in FIG. 4, the network slice identifier includes network slice serial number information. UE may determine whether network slice serial number information in the minimum system information includes serial number information of a network slice locally required. If the serial number information of the network slice locally required is included, UE may determine, according to a preset correspondence between network slice serial number information and other system information serial numbers, a serial number of other system information corresponding to the network slice locally required, acquire scheduling information of the other system information corresponding to the serial number of other system information from the minimum system information, and obtain the other system information according to the scheduling information.

In an embodiment, the network slice identifier information includes a single network slice identifier information or a group network slice identifier information of the network slice.

When the network slice identifier information is the single network slice identifier information of network slices, implementation process at UE may be as described above.

When the network slice identifier information is the group network slice identifier information, UE may determine a network slice to be accessed based on local service or business, determine corresponding serial number of the network device, and determine group network slice identifier information corresponding to the serial number of the network device. UE may determine whether group network slice identifier information in the minimum system information includes group network slice identifier information of the network slice locally required. If the group network slice identifier information of the network slice locally required is included, UE may determine, according to a preset correspondence between group network slice identifier information and other system information serial numbers, a serial number of other system information corresponding to the network slice locally required, acquire scheduling information of the other system information corresponding to the serial number of other system information from the minimum system information, and obtain the other system information according to the scheduling information.

In an embodiment, the indication information indicating presence PRACH configuration information, corresponding to one or more network slices, in other system information further includes:

a serial number of the other system information in which the PRACH configuration information corresponding to any network slices is present.

Step 703 may include:

acquiring the PRACH configuration information corresponding to the network slice included in the other system information according to the serial number of the other system information in which the PRACH configuration information corresponding to any network slices is present.

Figure 8:
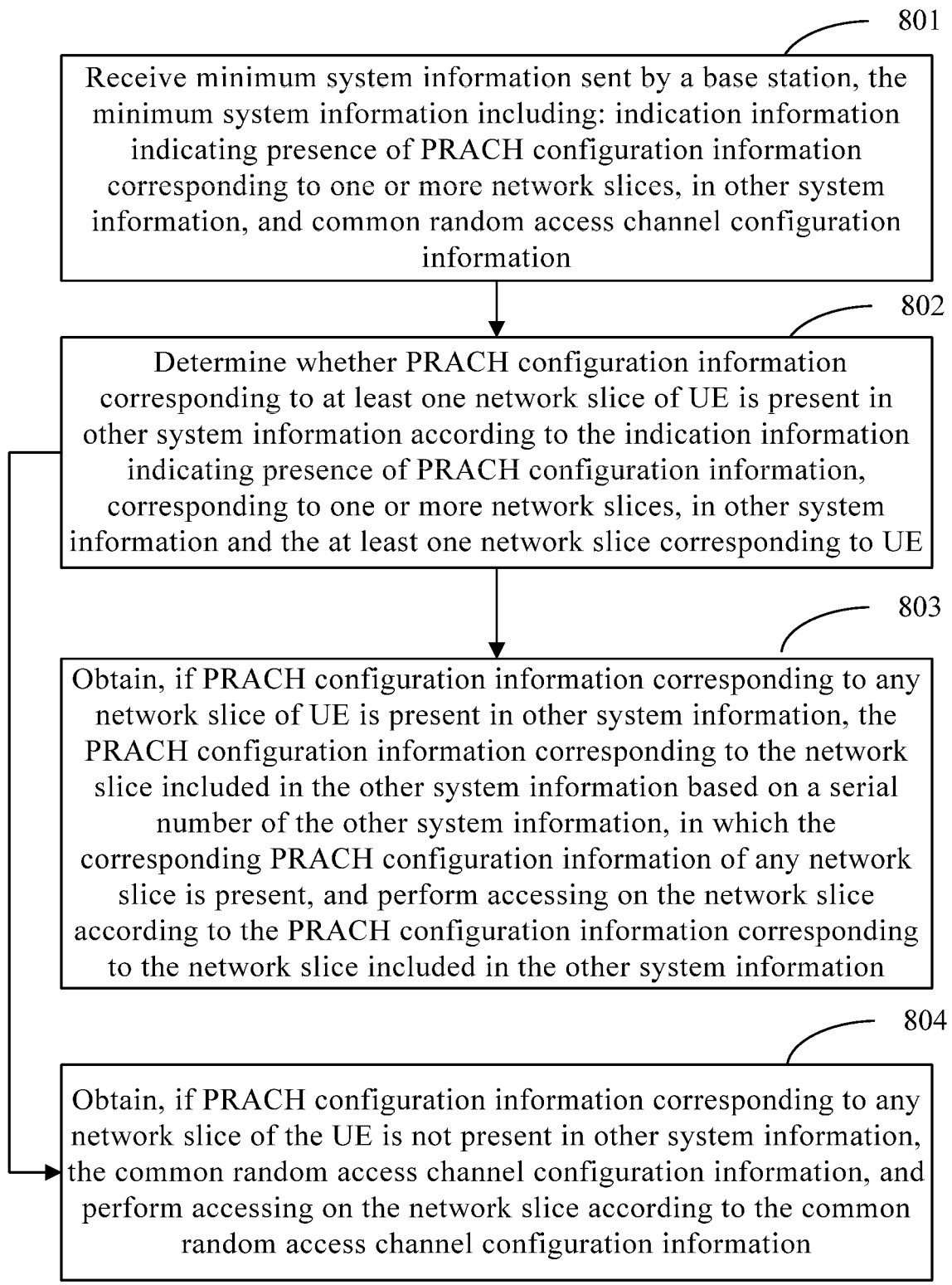
FIG. 8 is a flowchart illustrating an accessing method related to network slicing according to an exemplary embodiment.

FIG. 8 is a flowchart illustrating an accessing method related to network slicing according to an exemplary embodiment. The accessing method related to network slicing may be applied to a terminal which may include an equipment with mobile communication function, such as a mobile phone. As shown in FIG. 8, the method includes following steps 801-804.

In step 801, minimum system information sent by a base station is received. The minimum system information may include following two items:

i) indication information indicating presence of PRACH configuration information, corresponding to one or more network slices, in other system information, and ii) common random access channel configuration information.

In step 802, it is determined whether PRACH configuration information corresponding to at least one network slice of UE is present in other system information according to the indication information indicating presence of PRACH configuration information, corresponding to one or more network slices, in other system information and the at least one network slice corresponding to UE.

In step 803, if PRACH configuration information corresponding to any network slice of UE is present in other system information, the PRACH configuration information corresponding to the network slice included in the other system information is obtained based on a serial number of the other system information, in which the corresponding PRACH configuration information of any network slice is present, and accessing is performed on the network slice according to the PRACH configuration information corresponding to the network slice included in the other system information.

In step 804, if PRACH configuration information corresponding to any network slice of the UE is not present in other system information, the common random access channel configuration information is obtained, and accessing is performed on the network slice according to the common random access channel configuration information.

As shown in FIG. 5, the minimum system information includes both network slice identifier information and serial numbers of corresponding other system information. Through a structure of the minimum system information, the correspondence between the network slice identifier information and serial numbers of other system information is indicated. Based on the network slice identifier information of network slices in the minimum system information, it may be determined whether the network slice indicated by the network slice identifier information includes any network slice locally required. If a network slice locally required is includes, UE may retrieve a serial number of other system information, starting from and following the network slice identifier information, in the minimum system information, that is, a serial number of other system information corresponding to the network slice identifier information. Then, UE may acquire corresponding other system information, obtain corresponding PRACH configuration information of the network slice locally required from the other system information, then determine PRACH based on the PRACH configuration information, and complete cell accessing through PRACH.

In an embodiment, the other system information may further include a serial number of the other system information.

Figure 9:
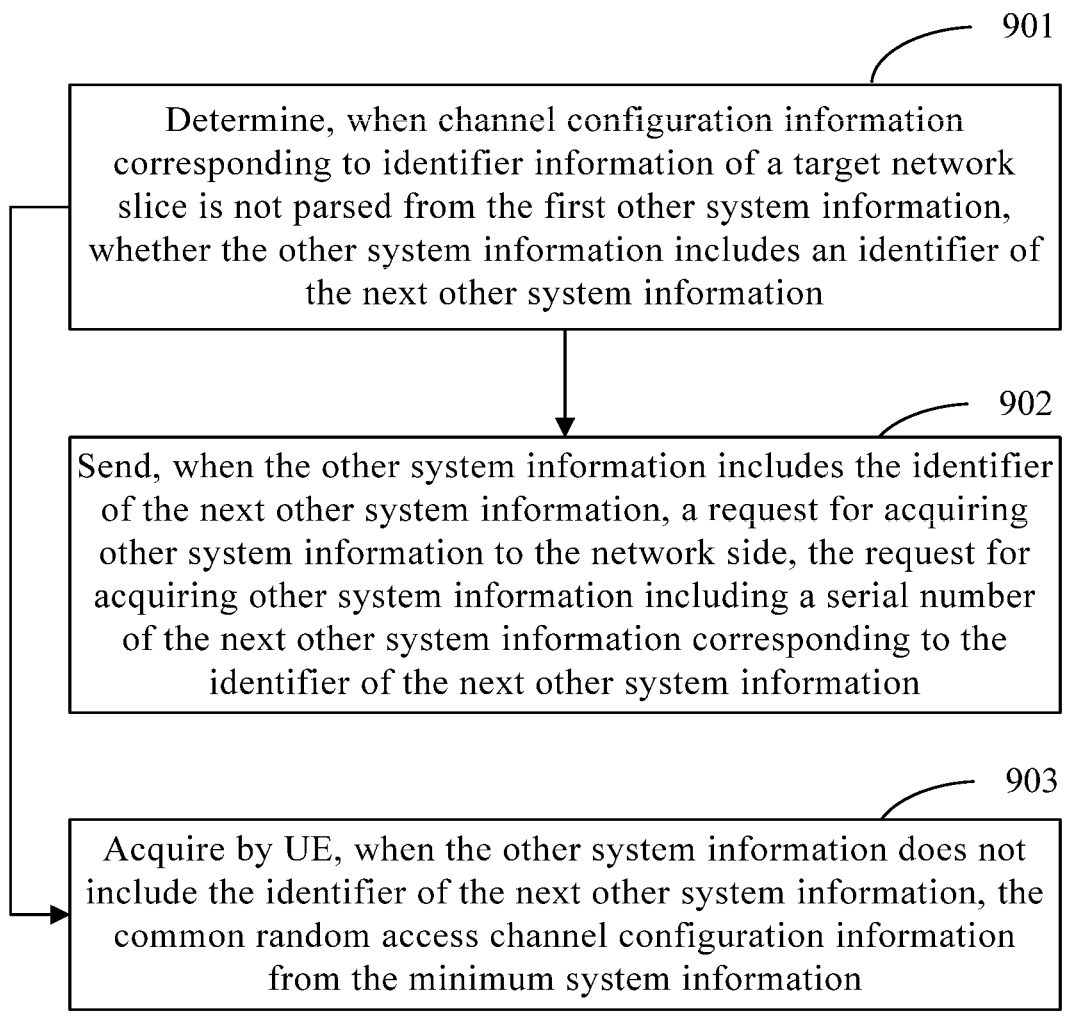
FIG. 9 is a flowchart illustrating an accessing method related to network slicing according to an exemplary embodiment.

As shown in FIG. 9, after acquiring first other system information fed back by the network side, the method further includes: step 901-step 903.

In step 901, when channel configuration information corresponding to identifier information of a target network slice is not parsed from the first other system information, it is determined whether the other system information includes an identifier of the next other system information.

In step 902, when the other system information includes the identifier of the next other system information, a request for acquiring other system information is sent to the network side, the request for acquiring other system information including a serial number of the next other system information corresponding to the identifier of the next other system information.

In step 903, when the other system information does not include the identifier of the next other system information, UE acquires the common random access channel configuration information from the minimum system information.

In an embodiment, the other system information may further include a presence flag for the next other system information.

Figure 10:
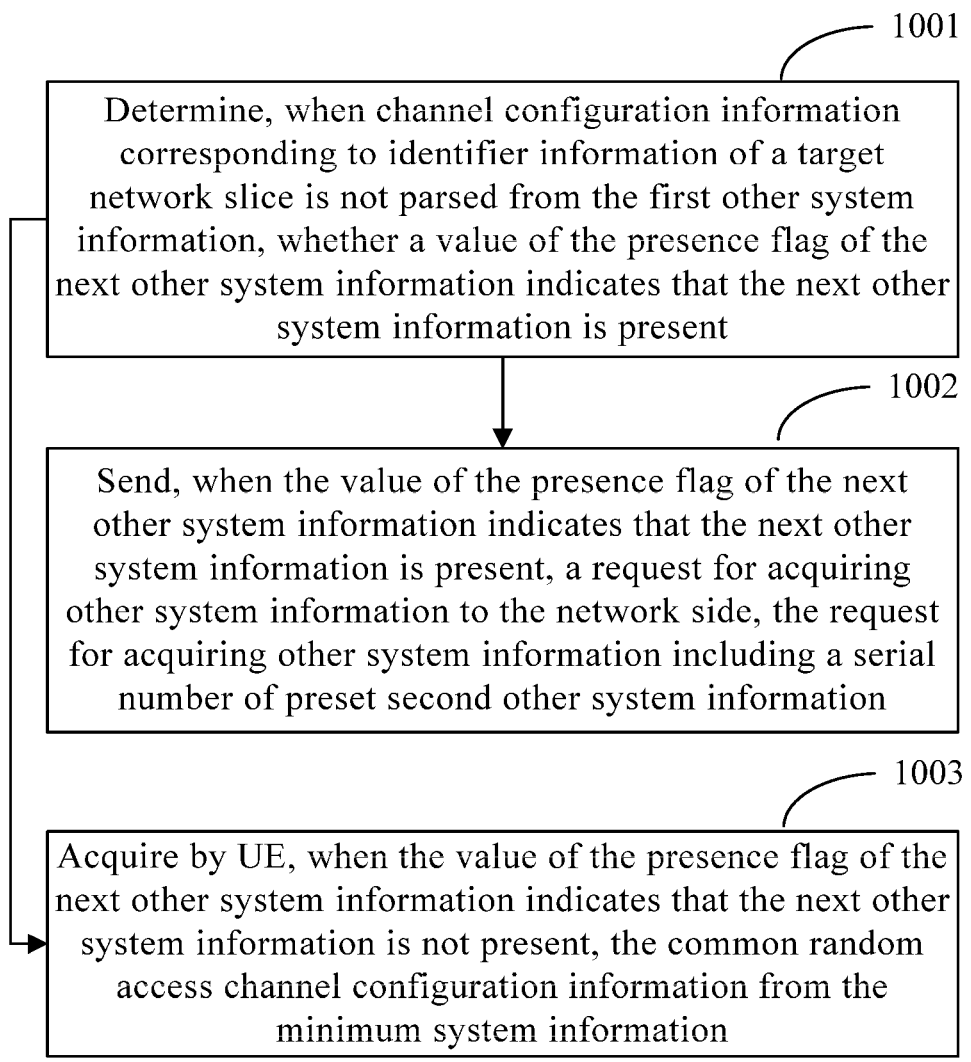
FIG. 10 is a flowchart illustrating an accessing method related to network slicing according to an exemplary embodiment.

As shown in FIG. 10, after acquiring first other system information fed back by the network side, the method further includes: step 1001-step 1003.

In step 1001, when channel configuration information corresponding to identifier information of a target network slice is not parsed from the first other system information, it is determined whether a value of the presence flag of the next other system information indicates that the next other system information is present.

In step 1002, when the value of the presence flag of the next other system information indicates that the next other system information is present, a request for acquiring other system information is sent to the network side, the request for acquiring other system information including a serial number of preset second other system information.

In step 1003, when the value of the presence flag of the next other system information indicates that the next other system information is not present, UE acquires the common random access channel configuration information from the minimum system information.

The following describes the accessing process related to network slicing in combination with the network side and UE through some embodiments.

Figure 11:
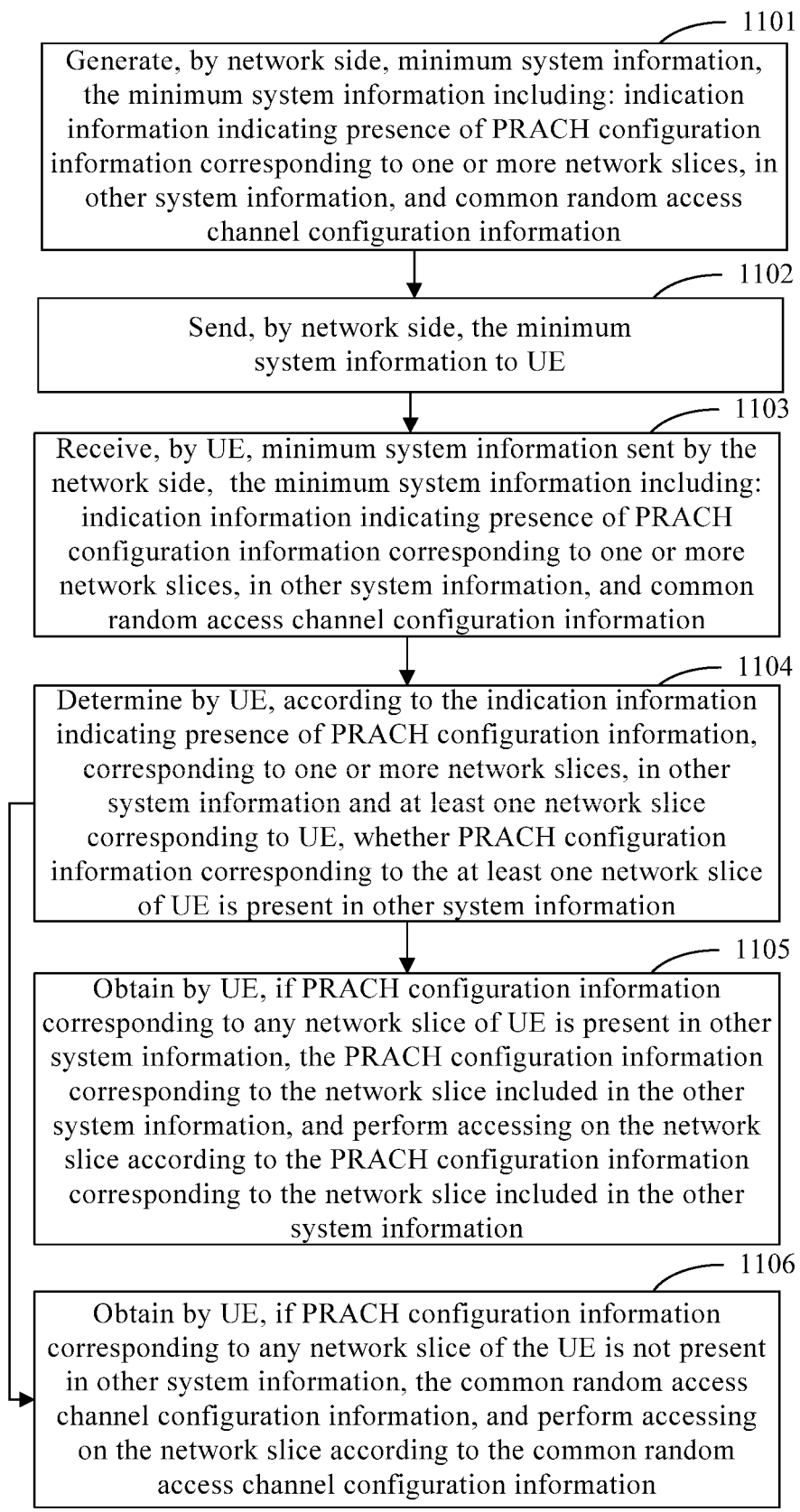
FIG. 11 is a flowchart illustrating an accessing method related to network slicing according to an exemplary embodiment.

FIG. 11 is a flowchart illustrating an accessing method related to network slicing according to an exemplary embodiment. The accessing method related to network slicing may be applied to the network side and UE. As shown in FIG. 11, the method includes following steps 1101-1106.

In step 1101, the network side generates minimum system information. The minimum system information may include following two items:

i) indication information indicating presence of PRACH configuration information, corresponding to one or more network slices, in other system information, and
ii) common random access channel configuration information.

In step 1102, the network side sends the minimum system information to UE.

In step 1103, UE receives minimum system information sent by the network side. The minimum system information may include following two items:

i) indication information indicating presence of PRACH configuration information, corresponding to one or more network slices, in other system information, and
ii) common random access channel configuration information.

In step 1104, UE determines, according to the indication information indicating presence of PRACH configuration information, corresponding to one or more network slices, in other system information and at least one network slice corresponding to UE, whether PRACH configuration information corresponding to the at least one network slice of UE is present in other system information.

In step 1105, if PRACH configuration information corresponding to any network slice of UE is present in other system information, UE obtains the PRACH configuration information corresponding to the network slice included in the other system information, and performs accessing on the network slice according to the PRACH configuration information corresponding to the network slice included in the other system information.

In step 1106, if PRACH configuration information corresponding to any network slice of the UE is not present in other system information, UE obtains the common random access channel configuration information, and performs accessing on the network slice according to the common random access channel configuration information.

Figure 12:
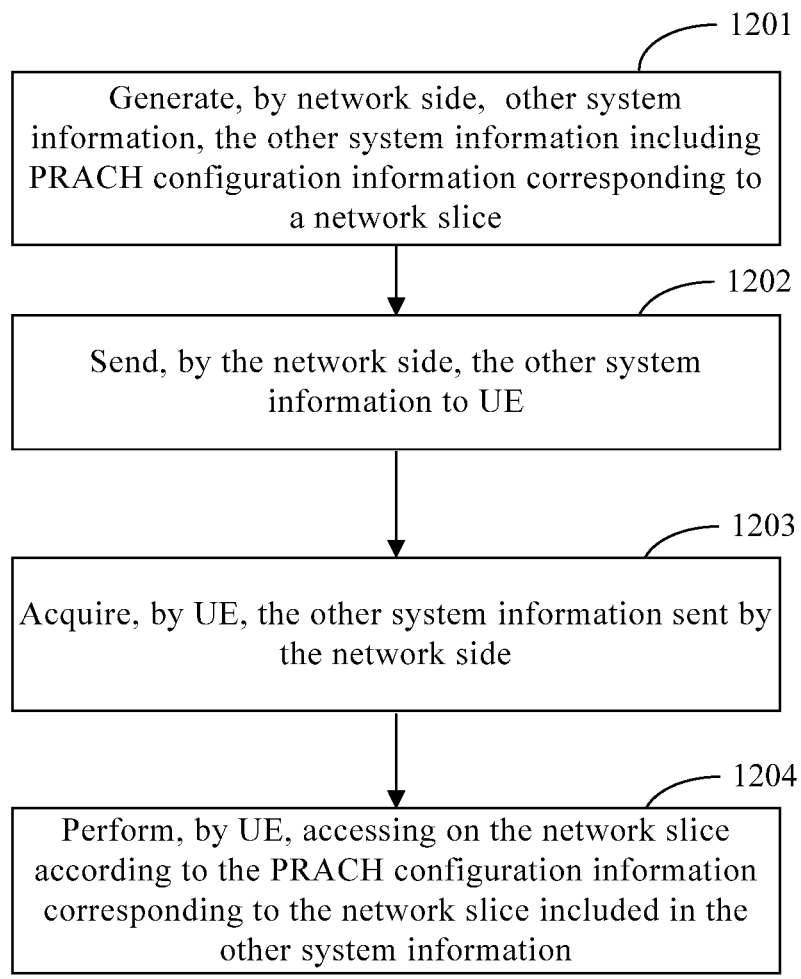
FIG. 12 is a flowchart illustrating an accessing method related to network slicing according to an exemplary embodiment.

FIG. 12 is a flowchart illustrating an accessing method related to network slicing according to an exemplary embodiment. The accessing method related to network slicing may be applied to the network side and UE. As shown in FIG. 12, the method includes following steps 1201-1205.

In step 1201, the network side generates other system information. The other system information may include PRACH configuration information corresponding to a network slice. The network slice is indicated by indication information in minimum system information.

In step 1202, the network side sends the other system information to UE. The network side may send the other system information in a manner of broadcasting or in response to receiving a request from UE.

In step 1203, UE acquires the other system information sent by the network side.

In step 1204, UE obtains PRACH configuration information corresponding to the network slice included in the other system information.

In step 1205, UE performs accessing on the network slice according to the PRACH configuration information corresponding to the network slice included in the other system information.

Following includes embodiments of apparatus provided by the disclosure, which may be used for performing the embodiments of method provided by the disclosure.

Figure 13:
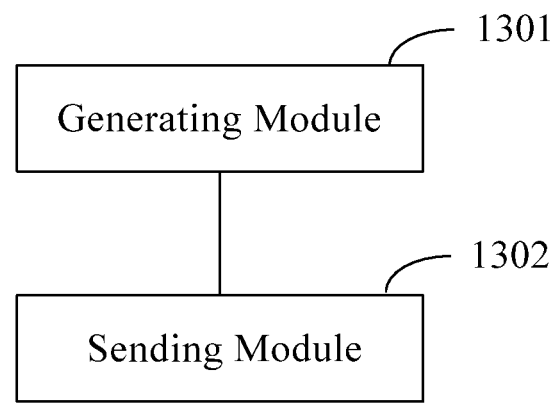
FIG. 13 is a block diagram illustrating an accessing apparatus related to network slicing according to an exemplary embodiment.

FIG. 13 is a block diagram illustrating an accessing apparatus related to network slicing according to an exemplary embodiment. The apparatus may be implemented as part or all of an electronic device by software, hardware or a combination of both. Referring to FIG. 13, the accessing apparatus related to network slicing may be applied to the network side and includes a generating module 1301 and a sending module 1302.

The generating module 1301 is configured to generate minimum system information, the minimum system information including following two items:
i) indication information indicating presence of PRACH configuration information, corresponding to one or more network slices, in other system information, and
ii) common random access channel configuration information.

The sending module 1302 is configured to send the minimum system information to UE.

In an embodiment, the indication information indicating presence of PRACH configuration information, corresponding to one or more network slices, in other system information includes:
respective network slice identification information of the one or more network slices corresponding to which the PRACH configuration information is present in the other system information.

In an embodiment, the indication information indicating presence of PRACH configuration information, corresponding to one or more network slices, in other system information further includes:
a serial number of the other system information in which the PRACH configuration information corresponding to at least one network slice is present.

Figure 14:
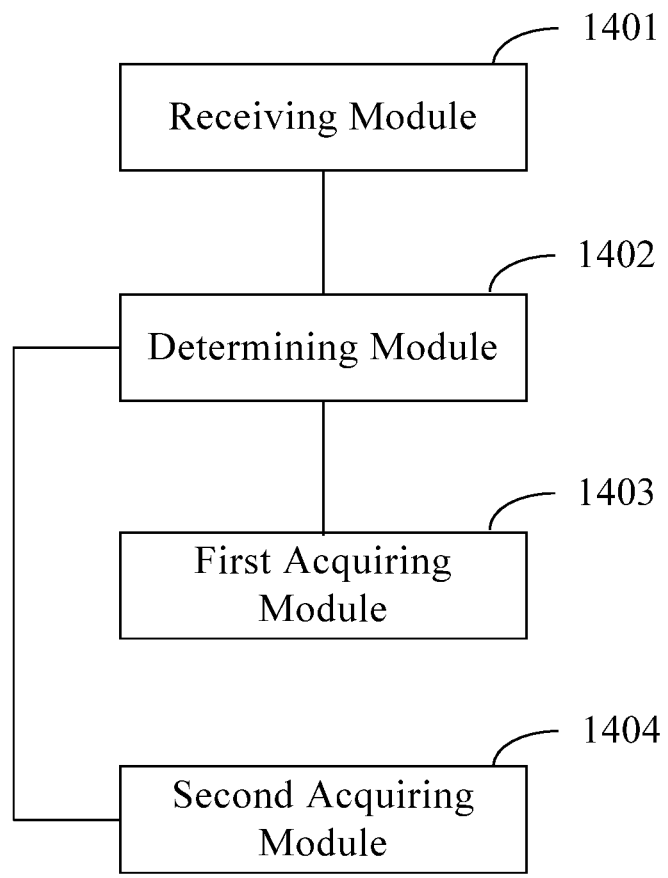
FIG. 14 is a block diagram illustrating an accessing apparatus related to network slicing according to an exemplary embodiment.

FIG. 14 is a block diagram illustrating an accessing apparatus related to network slicing according to an exemplary embodiment. The apparatus may be implemented as part or all of an electronic device by software, hardware or a combination of both. Referring to FIG. 14, the accessing apparatus related to network slicing may be applied to UE and includes a receiving module 1401, a determining module 1402, a first acquiring module 1403 and a second acquiring module 1404.

The receiving module 1401 is configured to receive minimum system information sent by a base station, the minimum system information including following two items:
i) indication information indicating presence of PRACH configuration information, corresponding to one or more network slices, in other system information, and
ii) common random access channel configuration information.

The determining module 1402 is configured to determine, according to the indication information indicating presence of PRACH configuration information, corresponding to one or more network slices, in other system information and at least one network slice corresponding to UE, whether PRACH configuration information corresponding to the at least one network slice of UE is present in other system information.

The first acquiring module 1403 is configured to acquire, if PRACH configuration information corresponding to any network slice of UE is present in other system information, the PRACH configuration information corresponding to the network slice included in the other system information, and access the network slice according to the PRACH configuration information corresponding to the network slice included in the other system information.

The second acquiring module 1404 is configured to acquire, if PRACH configuration information corresponding to any network slice of UE is not present in other system information, the common random access channel configuration information, and accessing the network slice according to the common random access channel configuration information.

In an embodiment, the indication information indicating presence of PRACH configuration information, corresponding to one or more network slices, in other system information includes:
respective network slice identification information of the one or more network slices corresponding to which the PRACH configuration information is present in the other system information.

In an embodiment, the indication information indicating presence of PRACH configuration information, corresponding to one or more network slices, in other system information further includes:
a serial number of the other system information in which the PRACH configuration information corresponding to any network slices is present.

Figure 15:
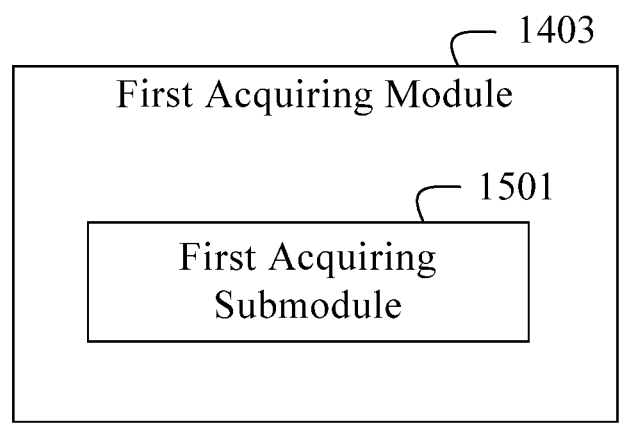
FIG. 15 is a block diagram illustrating a first acquiring module according to an exemplary embodiment.

As shown in FIG. 15, the first acquiring module 1403 includes a first acquiring submodule 1501.

The first acquiring submodule 1501 is configured to acquire the PRACH configuration information corresponding to the network slice included in the other system information according to the serial number of the other system information in which the PRACH configuration information corresponding to any network slices is present.

With regard to the apparatus in the above embodiments, the specific manner in which the respective modules perform the operations has been described in detail in the embodiment relating to the method, and will not be explained in detail herein.

Figure 16:
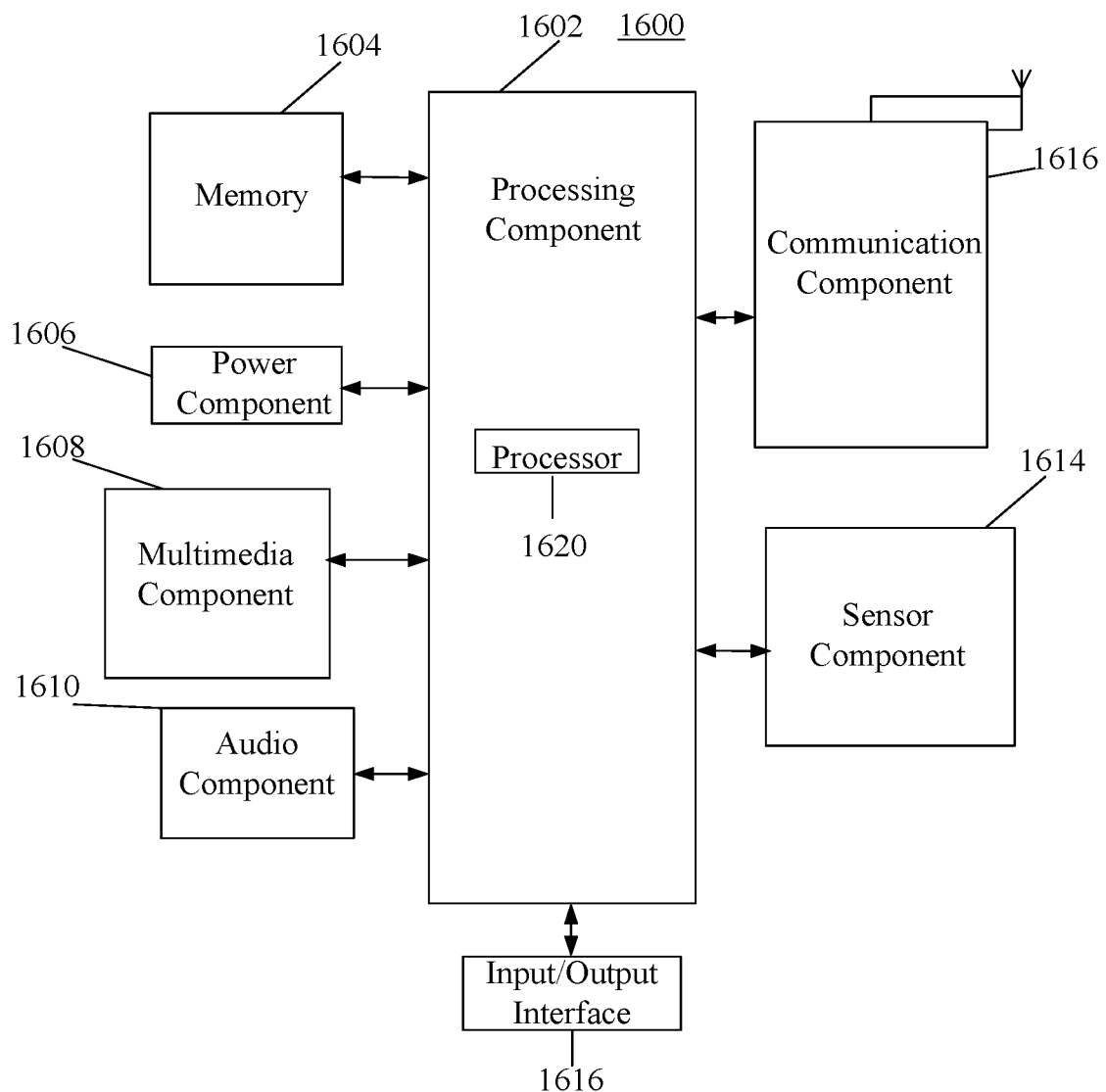
FIG. 16 is a block diagram adapted to an accessing device related to network slicing illustrated according to an exemplary embodiment.

FIG. 16 is a block diagram adapted to an accessing device related to network slicing illustrated according to an exemplary embodiment. For example, the device 1600 may be a mobile phone, a computer, a digital broadcast terminal, a messaging device, a gaming console, a tablet device, a medical device, a fitness device, a personal digital assistant, and the like.

The device 1600 may include one or more of the following components: a processing component 1602, a memory 1604, a power component 1606, a multimedia component 1608, an audio component 1610, an input/output (I/O) interface 1616, a sensor component 1614, and a communication component 1616.

The processing component 1602 typically controls overall operation of the device 1600, such as operations associated with display, telephone calls, data communications, camera operations, and recording operations. The processing component 1602 may include one or more processors 1620 to execute instructions to perform all or part of the steps of the above described methods. Moreover, The processing component 1602 may include one or more modules to facilitate interaction between the processing component 1602 and other components. For example, the processing component 1602 may include a multimedia module to facilitate interaction between the multimedia component 1608 and the processing component 1602.

The memory 1604 is configured to store various types of data to support operation at device 1600. Examples of such data include instructions for any application or method operating on device 1600, contact data, phone book data, messages, pictures, videos, and the like. The memory 1604 may be implemented by any type of volatile or non-volatile storage device, or a combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Disk or Optical Disk.

The power component 1606 provides power to various components of device 1600. The power component 1606 may include a power management system, one or more power sources, and other components associated with generating, managing, and distributing power for device 1600.

The multimedia component 1608 includes a screen between the device 1600 and user that provides an output interface. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may sense not only the boundary of the touch or sliding action, but also the duration and pressure associated with the touch or slide operation. In some embodiments, the multimedia component 1608 includes a front camera and/or a rear camera. When the device 1600 is in an operation mode, such as a photographing mode or a video mode, the front camera and/or the rear camera can receive external multimedia data. Each front and rear camera may be a fixed optical lens system or have focal length and optical zoom capabilities.

The audio component 1610 is configured to output and/or input an audio signal. For example, the audio component 1610 includes a microphone (MIC) that is configured to receive an external audio signal when device 1600 is in an operational mode, such as a call mode, a recording mode, and a voice recognition mode. The received audio signal may be further stored in memory 1604 or transmitted via communication component 1616. In some embodiments, the audio component 1610 also includes a speaker for outputting an audio signal.

The I/O interface 1616 provides an interface between the processing component 1602 and a peripheral interface module, which may be a keyboard, a click wheel, a button, or the like. These buttons may include, but are not limited to, a home button, a volume button, a start button, and a lock button.

The sensor component 1614 includes one or more sensors for providing state assessment of various aspects to device 1600. For example, sensor component 1614 may detect an open/closed state of device 1600, relative positioning of components, such as the display and keypad of device 1600. The sensor component 1614 may also detect a change in position of one component of device 1600 or device 1600, presence or absence of contact by the user with the device 1600, orientation or acceleration/deceleration of the device 1600 and the temperature change of the device 1600. The sensor component 1614 may include a proximity sensor configured to detect presence of nearby objects without any physical contact. The sensor component 1614 may also include a light sensor, such as a CMOS or CCD image sensor, for use in imaging applications. In some embodiments, the sensor component 1614 may also include an acceleration sensor, a gyro sensor, a magnetic sensor, a pressure sensor, or a temperature sensor.

The communication component 1616 is configured to facilitate wired or wireless communication between device 1600 and other devices. The device 1600 may access a wireless network based on a communication standard, such as WiFi, 2G or 3G, or a combination thereof. In an exemplary embodiment, the communication component 1616 receives broadcast signals from an external broadcast management system or broadcasts associated information via a broadcast channel. In an exemplary embodiment, the communication component 1616 also includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, device 1600 may be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor or other electronic component implementation for performing the above methods.

In an exemplary embodiment, there is also provided a non-transitory computer readable storage medium including instructions, such as a memory 1604 including instructions executable by the processor 1620 of device 1600, to perform the above method. For example, the non-transitory computer readable storage medium may be a ROM, a random access memory (RAM), a CD-ROM, a magnetic tape, a floppy disk, and an optical data storage device.

In an exemplary embodiment, there is provided an accessing device related to network slicing including:
a processor, and
a memory configured to store instructions executable by the processor;
wherein the processor is configured to:
receive minimum system information sent by a base station, the minimum system information including two items:
i) indication information indicating presence of PRACH configuration information, corresponding to one or more network slices, in other system information,
ii) common random access channel configuration information;
determine whether PRACH configuration information corresponding to at least one network slice of the UE is present in other system information according to the indication information indicating presence of PRACH configuration information, corresponding to one or more network slices, in other system information and the at least one network slice corresponding to the UE;
acquire, if PRACH configuration information corresponding to any network slice of the UE is present in other system information, the PRACH configuration information corresponding to the network slice included in the other system information, and access the network slice according to the PRACH configuration information corresponding to the network slice included in the other system information; and
acquire, if PRACH configuration information corresponding to any network slice of the UE is not present in other system information, the common random access channel configuration information, and access the network slice according to the common random access channel configuration information.

The processor is further configured to:
the indication information indicating presence of PRACH configuration information, corresponding to one or more network slices, in other system information includes:
respective network slice identification information of the one or more network slices corresponding to which the PRACH configuration information is present in the other system information.

The processor is further configured to:

the indication information indicating presence of PRACH configuration information, corresponding to one or more network slices, in other system information further includes:

a serial number of the other system information in which the PRACH configuration information corresponding to any network slices is present;

the acquiring the PRACH configuration information corresponding to the network slice included in the other system information includes:

acquiring the PRACH configuration information corresponding to the network slice included in the other system information according to the serial number of the other system information in which the PRACH configuration information corresponding to any network slices is present.

A non-transitory computer-readable storage medium, when instructions in the storage medium are executed by a processor of the device 1600, the device 1600 is caused to perform the above accessing method related to network slicing. The method includes:

receiving minimum system information sent by a base station, the minimum system information including two items:
  i) indication information indicating presence of PRACH configuration information, corresponding to one or more network slices, in other system information,
  ii) common random access channel configuration information;

determining whether PRACH configuration information corresponding to at least one network slice of the UE is present in other system information according to the indication information indicating presence of PRACH configuration information, corresponding to one or more network slices, in other system information and the at least one network slice corresponding to the UE;

acquiring, if PRACH configuration information corresponding to any network slice of the UE is present in other system information, the PRACH configuration information corresponding to the network slice included in the other system information, and accessing the network slice according to the PRACH configuration information corresponding to the network slice included in the other system information; and acquiring, if PRACH configuration information corresponding to any network slice of the UE is not present in other system information, the common random access channel configuration information, and accessing the network slice according to the common random access channel configuration information.

The instructions in the storage medium may further include:

the indication information indicating presence of PRACH configuration information, corresponding to one or more network slices, in other system information includes:

respective network slice identification information of the one or more network slices corresponding to which the PRACH configuration information is present in the other system information.

The instructions in the storage medium may further include:

the indication information indicating presence of PRACH configuration information, corresponding to one or more network slices, in other system information further includes:

a serial number of the other system information in which the PRACH configuration information corresponding to any network slices is present;

the acquiring the PRACH configuration information corresponding to the network slice included in the other system information includes:

acquiring the PRACH configuration information corresponding to the network slice included in the other system information according to the serial number of the other system information in which the PRACH configuration information corresponding to any network slices is present.

Figure 17:
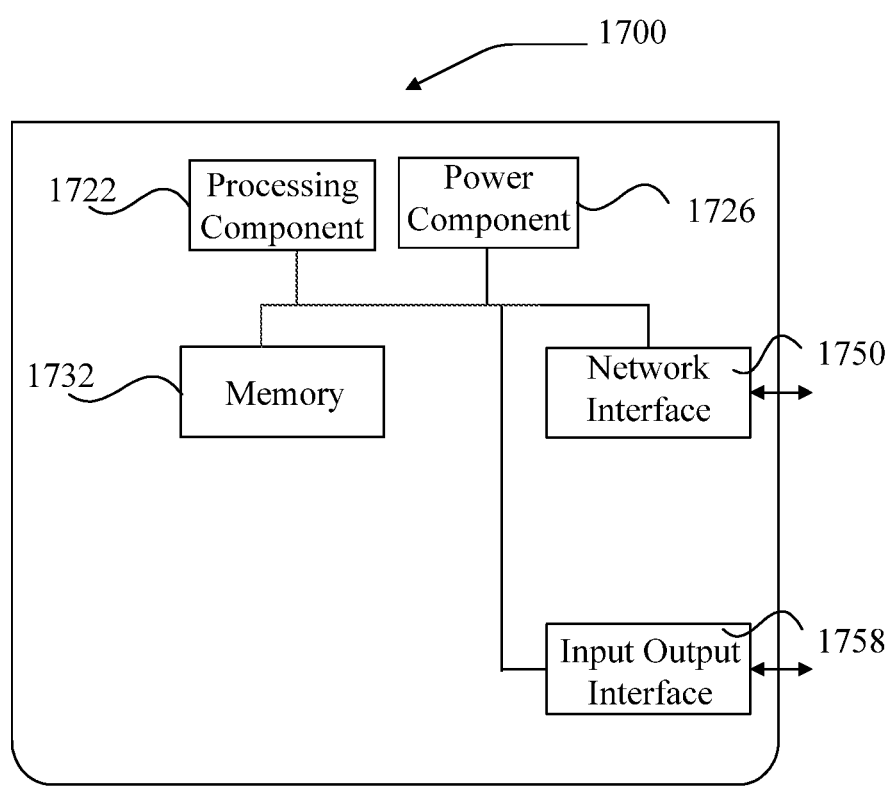
FIG. 17 is a block diagram adapted to an accessing device related to network slicing illustrated according to an exemplary embodiment.

FIG. 17 is a block diagram adapted to an accessing device related to network slicing illustrated according to an exemplary embodiment. For example, the device 1700 may be provided as a computer. Referring to FIG. 17, the device 1700 includes a processing component 1722 that further includes one or more processors, and memory resources represented by memory 1732 for storing instructions executable by processing component 1722, such as an application. The application stored in memory 1732 may include one or more modules each corresponding to a set of instructions. Additionally, the processing component 1722 is configured to execute instructions to perform the method described above to synchronize data.

The device 1700 may also include a power supply component 1726 configured to perform power management of the device 1700, a wired or wireless network interface 1750 configured to connect the device 1700 to network, and an input/output (I/O) interface 1758. The device 1700 may be operated based on an operating system stored in the memory 1732, such as Windows Server™, Mac OS X™, Unix™, Linux™, FreeBSD™ or the like.

In an exemplary embodiment, there is provided an accessing device related to network slicing including:

a processor, and a memory configured to store instructions executable by the processor;

wherein the processor is configured to:

generate minimum system information, the minimum system information including two items:
  i) indication information indicating presence of PRACH configuration information, corresponding to one or more network slices, in other system information,
  ii) common random access channel configuration information; and send the minimum system information to a UE.

The processor is further configured to:

the indication information indicating presence of PRACH configuration information, corresponding to one or more network slices, in other system information includes:

respective network slice identification information of the one or more network slices corresponding to which the PRACH configuration information is present in the other system information.

The processor is further configured to:

the indication information indicating presence of PRACH configuration information, corresponding to one or more network slices, in other system information further includes:

a serial number of the other system information in which the PRACH configuration information corresponding to at least one network slice is present.

A non-transitory computer-readable storage medium, when instructions in the storage medium are executed by a processor of the device 1700, the device 1700 is caused to perform the above accessing method related to network slicing. The method includes:

generating minimum system information, the minimum system information including two items:

i) indication information indicating presence of PRACH configuration information, corresponding to one or more network slices, in other system information, ii) common random access channel configuration information; and sending the minimum system information to a UE.

The instructions in the storage medium may further include:

the indication information indicating presence of PRACH configuration information, corresponding to one or more network slices, in other system information includes:

respective network slice identification information of the one or more network slices corresponding to which the PRACH configuration information is present in the other system information.

The instructions in the storage medium may further include:

the indication information indicating presence of PRACH configuration information, corresponding to one or more network slices, in other system information further includes:

a serial number of the other system information in which the PRACH configuration information corresponding to at least one network slice is present.

Other embodiments of the present disclosure will be apparent to those skilled in the art from consideration of the specification and practice of the invention disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An accessing method related to network slicing, being applied to a base station, the method comprising:
   generating minimum system information, the minimum system information including two items:
   i) indication information indicating presence of physical random access channel (PRACH) configuration information, corresponding to one or more network slices, in other system information,
   ii) common random access channel configuration information; and
   sending the minimum system information to a user equipment.

2. The method according to claim 1, wherein the indication information indicating presence of PRACH configuration information, corresponding to one or more network slices, in other system information comprises:
   respective network slice identification information of the one or more network slices corresponding to which the PRACH configuration information is present in the other system information.

3. The method according to claim 2, wherein the indication information indicating presence of PRACH configuration information, corresponding to one or more network slices, in other system information further comprises:
   a serial number of the other system information in which the PRACH configuration information corresponding to at least one network slice is present.

4. The method according to claim 1, wherein the minimum system information further comprises related information of cell selection and accessing, and scheduling information of other system information.

5. An accessing method related to network slicing, being applied to a user equipment, the method comprising:
   receiving minimum system information sent by a base station, the minimum system information including two items:
   i) indication information indicating presence of physical random access channel (PRACH) configuration information, corresponding to one or more network slices, in other system information,
   ii) common random access channel configuration information;
   determining whether PRACH configuration information corresponding to at least one network slice of the user equipment is present in other system information according to the indication information indicating presence of PRACH configuration information, corresponding to one or more network slices, in other system information and the at least one network slice corresponding to the user equipment;
   acquiring, if PRACH configuration information corresponding to any network slice of the user equipment is present in other system information, the PRACH configuration information corresponding to the network slice included in the other system information, and accessing the network slice according to the PRACH configuration information corresponding to the network slice included in the other system information; and
   acquiring, if PRACH configuration information corresponding to any network slice of the user equipment is not present in other system information, the common random access channel configuration information, and accessing the network slice according to the common random access channel configuration information.

6. The method according to claim 5, wherein the indication information indicating presence of PRACH configuration information, corresponding to one or more network slices, in other system information comprises:
   respective network slice identification information of the one or more network slices corresponding to which the PRACH configuration information is present in the other system information.

7. The method according to claim 6, wherein the indication information indicating presence of PRACH configuration information, corresponding to one or more network slices, in other system information further comprises:
   a serial number of the other system information in which the PRACH configuration information corresponding to any network slices is present;
   the acquiring the PRACH configuration information corresponding to the network slice included in the other system information comprises:
   acquiring the PRACH configuration information corresponding to the network slice included in the other system information according to the serial number of the other system information in which the PRACH configuration information corresponding to any network slices is present.

8. The method according to claim 5, wherein the indication information indicating presence of PRACH configuration information, corresponding to one or more network slices, in other system information further comprises:
a serial number of the other system information in which the PRACH configuration information corresponding to any network slices is present;
the acquiring the PRACH configuration information corresponding to the network slice included in the other system information comprises:
acquiring the PRACH configuration information corresponding to the network slice included in the other system information according to the serial number of the other system information in which the PRACH configuration information corresponding to any network slices is present.

9. The method according to claim 5, wherein the minimum system information further comprises related information of cell selection and accessing, and scheduling information of other system information.

10. An accessing device related to network slicing, being applied to a base station, the device comprising:
a processor, and
a memory configured to store instructions executable by the processor;
wherein the processor is configured to:
generate minimum system information, the minimum system information including two items:
i) indication information indicating presence of physical random access channel (PRACH) configuration information, corresponding to one or more network slices, in other system information,
ii) common random access channel configuration information; and
send the minimum system information to a user equipment.

11. The device according to claim 10, wherein the indication information indicating presence of PRACH configuration information, corresponding to one or more network slices, in other system information comprises:
respective network slice identification information of the one or more network slices corresponding to which the PRACH configuration information is present in the other system information.

12. The device according to claim 11, wherein the indication information indicating presence of PRACH configuration information, corresponding to one or more network slices, in other system information further comprises:
a serial number of the other system information in which the PRACH configuration information corresponding to at least one network slice is present.

13. The device according to claim 10, wherein the minimum system information further comprises related information of cell selection and accessing, and scheduling information of other system information.

14. An accessing device related to network slicing, being applied to a user equipment, the device comprising:
a processor, and
a memory configured to store instructions executable by the processor;
wherein the processor is configured to:
receive minimum system information sent by a base station, the minimum system information including two items:
i) indication information indicating presence of physical random access channel (PRACH) configuration information, corresponding to one or more network slices, in other system information,
ii) common random access channel configuration information;
determine whether PRACH configuration information corresponding to at least one network slice of the user equipment is present in other system information according to the indication information indicating presence of PRACH configuration information, corresponding to one or more network slices, in other system information and the at least one network slice corresponding to the user equipment;
acquire, if PRACH configuration information corresponding to any network slice of the user equipment is present in other system information, the PRACH configuration information corresponding to the network slice included in the other system information, and access the network slice according to the PRACH configuration information corresponding to the network slice included in the other system information; and
acquire, if PRACH configuration information corresponding to any network slice of the user equipment is not present in other system information, the common random access channel configuration information, and access the network slice according to the common random access channel configuration information.

15. The device according to claim 14, wherein the indication information indicating presence of PRACH configuration information, corresponding to one or more network slices, in other system information comprises:
respective network slice identification information of the one or more network slices corresponding to which the PRACH configuration information is present in the other system information.

16. The device according to claim 15, wherein the indication information indicating presence of PRACH configuration information, corresponding to one or more network slices, in other system information further comprises:
a serial number of the other system information in which the PRACH configuration information corresponding to any network slices is present;
the processor configured to acquire the PRACH configuration information corresponding to the network slice included in the other system information is configured to:
acquire the PRACH configuration information corresponding to the network slice included in the other system information according to the serial number of the other system information in which the PRACH configuration information corresponding to any network slices is present.

17. The device according to claim 14, wherein the indication information indicating presence of PRACH configuration information, corresponding to one or more network slices, in other system information further comprises:
a serial number of the other system information in which the PRACH configuration information corresponding to any network slices is present;
the processor configured to acquire the PRACH configuration information corresponding to the network slice included in the other system information is configured to:
acquire the PRACH configuration information corresponding to the network slice included in the other system information according to the serial number of the other system information in which the PRACH configuration information corresponding to any network slices is present.

18. The device according to claim 14, wherein the minimum system information further comprises related information of cell selection and accessing, and scheduling information of other system information.

* * * * *